May 3, 1966 R. L. COLE ETAL 3,249,266
DISPENSER WITH ROTATABLY MOUNTED TRAP CHAMBER
Filed June 18, 1964
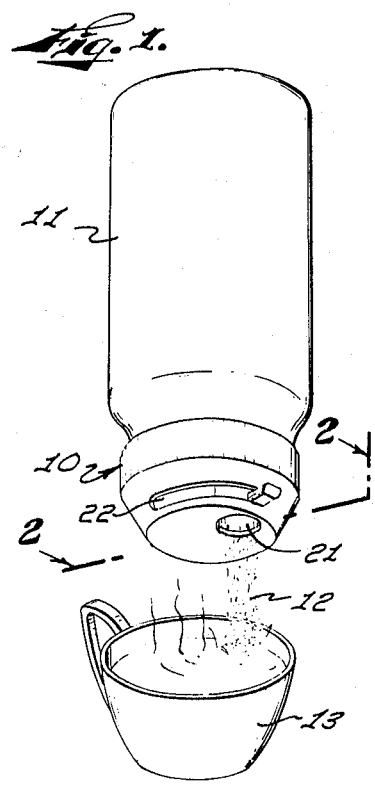
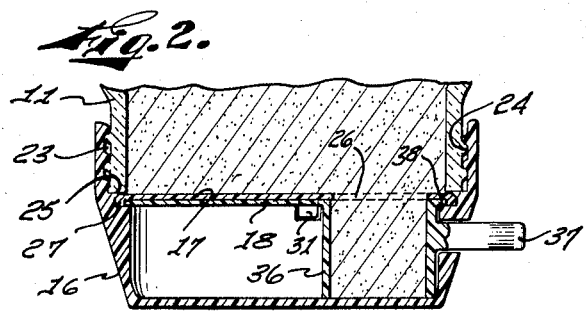
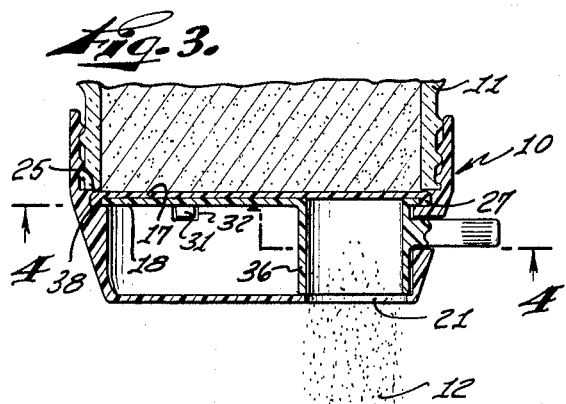
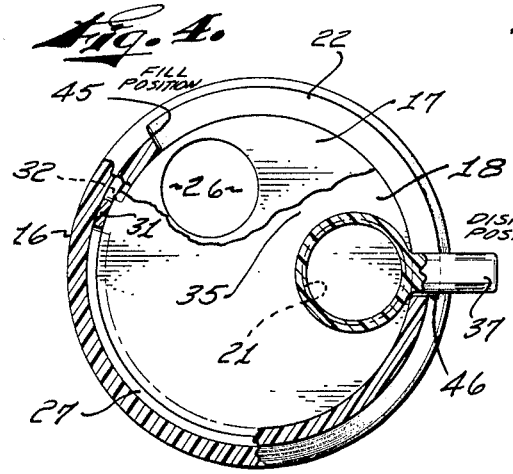
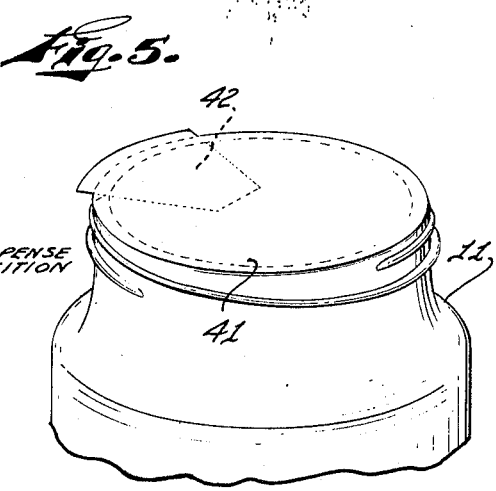
INVENTOR.
RONALD L. COLE
WILLIAM L. JOLLEY
BY FOWLER, KNOBBE
& GAMBRELL
ATTORNEYS

United States Patent Office 3,249,266
Patented May 3, 1966

3,249,266
DISPENSER WITH ROTATABLY MOUNTED TRAP CHAMBER
Ronald Lawrence Cole, 11111 Mindora Ave., Los Alamitos, Calif., and William Lewis Jolley, 5932 Ludell St., Apt. 9, Bell Gardens, Calif.
Filed June 18, 1964, Ser. No. 376,169
4 Claims. (Cl. 222—362)

This invention relates to measuring and dispensing devices, and more particularly to apparatus for measuring and dispensing preselected quantities of coffee, tea or other granulated materials.

Dispensing devices adapted to fit on the top of instant coffee, tea or similar containers are not new. A number of such devices are known. Representative of such dispensers are those disclosed in Patent 2,904,230 issued to H. H. Worth on September 15, 1959, and Patent 2,815,154 issued to G. E. Smith on December 3, 1957.

However, these and other prior art measuring and dispensing devices require an excessive number of parts, are not adapted to economical manufacturing methods, and are too bulky in many cases.

These prior art devices generally perform the same dispensing operation contemplated herein but in doing so, they are unnecessarily complex. For example, the Worth patent discloses a coffee dispenser wherein a pair of disks, a cap and a segmented receiver are required, all of which must be oriented about a central post to which they are variously keyed or retained.

The present invention, on the other hand, employs a minimum number of parts which cooperate to efficiently measure and dispense coffee from its container.

The principal object of this invention is to provide a measuring and dispensing device for granulated materials that is simple to construct, rugged, and inexpensive to manufacture.

Other objects, features and advantages of this invention may be more fully understood when the following description is read in reference to the drawings in which:

FIG. 1 is a perspective of a dispenser formed in accordance with the present invention as it may be attached to an instant coffee container;

FIG. 2 is a partial cross-section of the improved dispenser forming the present invention showing the orientation of the parts in its filling position;

FIG. 3 is a partial cross-section similar to that of FIG. 2 showing the orientation of the parts of the dispenser in its dispensing position;

FIG. 4 is a section view taken along line 4—4 of FIG. 3 showing the relationship between various parts of the dispenser; and, FIG. 5 is an alternative embodiment for a part of the improved dispenser forming the present invention.

The dispenser 10 as illustrated in FIG. 1 is threadedly attached to an instant coffee jar 11 so that it can be operated to dispense granulated coffee 12 into a cup of hot water 13.

In the first exemplary embodiment of FIGS. 1–4, the dispenser 10 basically includes a cap 16, a stationary or fixed plate 17 and a movable plate 18 intermediate thereto. The circular cap 16 has an off-center, eccentric circular aperture 21 formed in its top and an arcuate slot 22 defined by its side surfaces, as particularly illustrated in FIG. 1. The interior of the cap has a series of threads 23 formed therein to engage the threads 24 on the conventional container or jar 11. Also, an inwardly projecting annular shoulder lip 25 is formed intermediate the threads 23 and the upper part of the cap 16 (in the lower part of the drawing of FIG. 2) for a purpose hereinafter explained.

The fixed or stationary plate 17 is circular and has a diameter sufficient to cover the mouth of jar 11. It also has an off-center or eccentric circular aperture 26 formed therethrough and an annular upstanding shoulder 27 formed on it which journals the circular movable plate 18 for rotation between a filling position and a dispensing position. The diameter of the movable plate 18 corresponds to the inside diameter of upstanding shoulder 27 on fixed plate 17.

The movable plate 18 and fixed plate 17 are snapped into cap 16 and the lip 25 engages the edge of plate 17 to hold the parts of the dispenser together. Thereafter, the cap 16 is threaded on to the jar 11. Of course, the lip 25 could be omitted since the cap 16 will hold plate 17 by way of upstanding shoulder 27 but it is preferably provided so that the dispenser 10 is held together even when it is not on a jar such as 11.

The movable plate 18 has a sleeve-like reservoir 36 attached eccentrically to it which depends downwardly (with respect to the orientation of the drawings). It is open at both ends, and its height is such that it fits between fixed plate 17 and the inner side of the top of the cap 16. The sleeve 36 is both a measuring device for the desired quantity of coffee or other granulated material and a storage receptacle.

The cap 16 is provided with an inwardly projecting lug 31 which engages a notch or slot 32 formed on the outer edge of the fixed plate 17. This locks the cap 16 and the fixed plate in a preselected rotational relationship to each other, which is illustrated in FIG. 4 by the angularly displaced relationship between apertures 26 and 21. Fixed plate 17 and the cap 16 are rotationally oriented with respect to each other so that the apertures 21 and 26 do not overlap and, in fact, are rotationally separated far enough to provide an intermediate position, generally indicated as 35, where the aperture 26 is closed off by the movable plate 18 and yet aperture 21 does not register with the open dispensing reservoir 36. Or to put it another way, both ends of the reservoir 36 are closed, one by plate 17 and the other by the top of cap 16.

When the plate 18 is rotated so sleeve 36 overlies aperture 26 and the jar 11 is tilted as shown in FIG. 1, granules of coffee will fill the sleeve 36. Thereafter, when plate 18 rotates sleeve 36 to a position overlying aperture 21, the coffee is dispensed.

The intermediate space 35, previously referred to, is provided so that the dispenser sleeve can be filled, and later dispensed even though the jar is turned right side up beforehand.

A lever 37 is affixed to the side of sleeve 36 through slot 44 in cap 16 to provide means for manually rotating the movable plate 18 between the filling position registering with aperture 26 and the dispensing position registering with aperture 21. The ends 45 and 46 of slot 44 act as stops for the positions of the movable plate 18 and its sleeve 36 in their filling and dispensing positions, respectively.

It will be noted in FIGS. 2 and 3, particularly, that the height of upstanding shoulder 27 is slightly greater than the thickness of movable plate 18 so that plate 18 is freely journalled in the annular shoulder 27 for movement between the filling and dispensing positions.

FIG. 5 illustrates an alternative embodiment for the fixed plate 17. Instead of using plate 17, there is provided a piece of paper 41, such as that sealing the top of an instant coffee or tea jar. The paper 41 is provided with a perforated tear-out 42. In assembly, the movable plate 18, which will in this situation be of approximately the same diameter as old plate 17, is rotatably supported between the annular shoulder 38 on cap 16 and the inwardly projecting lip 25. After movable plate 18 is snapped into place and after the tab 42 has been removed to provide an aperture corresponding to 26 of plate 17, the cap 16 is threaded on jar 11.

In using the alternative embodiment, of course, the cap 16 has to be oriented with respect to the aperture formed by the removal of tab 42 so that the reservoir 36 will move between the filling and dispensing positions as previously explained. However, the position of the tab 42 can be properly related to the threads on the jar. In most cases, this will, in turn, properly orient the aperture created by 42 and the aperture 21 in the cap 16.

While this invention has been described with respect to a preferred embodiment and modification thereof, certain other variations can be envisaged by those skilled in the art without departing from the spirit and scope of the invention. Therefore, the invention should be limited only to the extent of the appended claims.

What is claimed is:

1. A dispenser for use on a jar containing granules of coffee, tea or the like comprising
   a jar cap having an inwardly projecting lip formed interior thereof and a top;
   a plate retained by said projecting lip in said cap in spaced apart relation to the top of said cap and having an eccentric aperture formed therethrough;
   said plate being oriented with respect to said cap so that said apertures do not overlie each other;
   an open-ended sleeve rotatably supported between the top of said cap and said plate; and
   means operable to move said sleeve between a first position in registration with the aperture in said plate and a second position in registration with the aperture in said cap.

2. A dispenser for use on a jar containing granules of coffee, tea or the like comprising, in combination,
   an apertured cap having means to attach it to a jar containing granulated material;
   a stationary plate comprising a paper cover affixed to the mouth of a jar to seal the ingredients therein and having an aperture therethrough;
   said paper cover including a frangible sector covering said aperture
   said paper cover oriented with respect to said cap whereby the apertures in said paper cover and said cap do not overlap;
   a movable plate rotatably supported by said cap intermediate said cover and said cap and having a reservoir associated therewith; and,
   means to rotate said movable plate so that in a filling position said reservoir registers with the aperture in said cover and in a dispensing position said reservoir registers with the aperture in said cap.

3. A dispenser for use on a jar containing granules of coffee, tea or the like comprising, in combination,
   an apertured cap having means to attach it to a jar containing granulated material;
   a stationary plate having an aperture therethrough and a shoulder formed at the periphery thereof;
   said stationary plate being supported between said cap and the mouth of said jar and oriented with respect to said cap whereby its aperture does not overlap the aperture in said cap;
   a movable plate having a reservoir associated therewith journalled for rotation within the confines of said shoulder on said stationary plate;
   stop means defining a filling position where said reservoir registers with the aperture in said stationary plate and a dispensing position where said reservoir registers with the aperture in said cap; and,
   means to rotate said movable plate between said filling and dispensing positions.

4. A dispenser in accordance with claim 3 wherein the orientation of said stationary plate with respect to said cap is obtained by forming an inwardly projecting lug on said cap which extends into a notch formed in the outer edge of said upstanding shoulder on said stationary plate.

References Cited by the Examiner

UNITED STATES PATENTS 2,123,906 7/1938 Masbach et al. _____ 222—541 X
3,129,853 4/1964 Hoskins et al. _____ 222—362 X LOUIS J. DEMBO, *Primary Examiner.*